(No Model.)
E. PRINGLE.
GLOVE FASTENING.
No. 443,792. Patented Dec. 30, 1890.
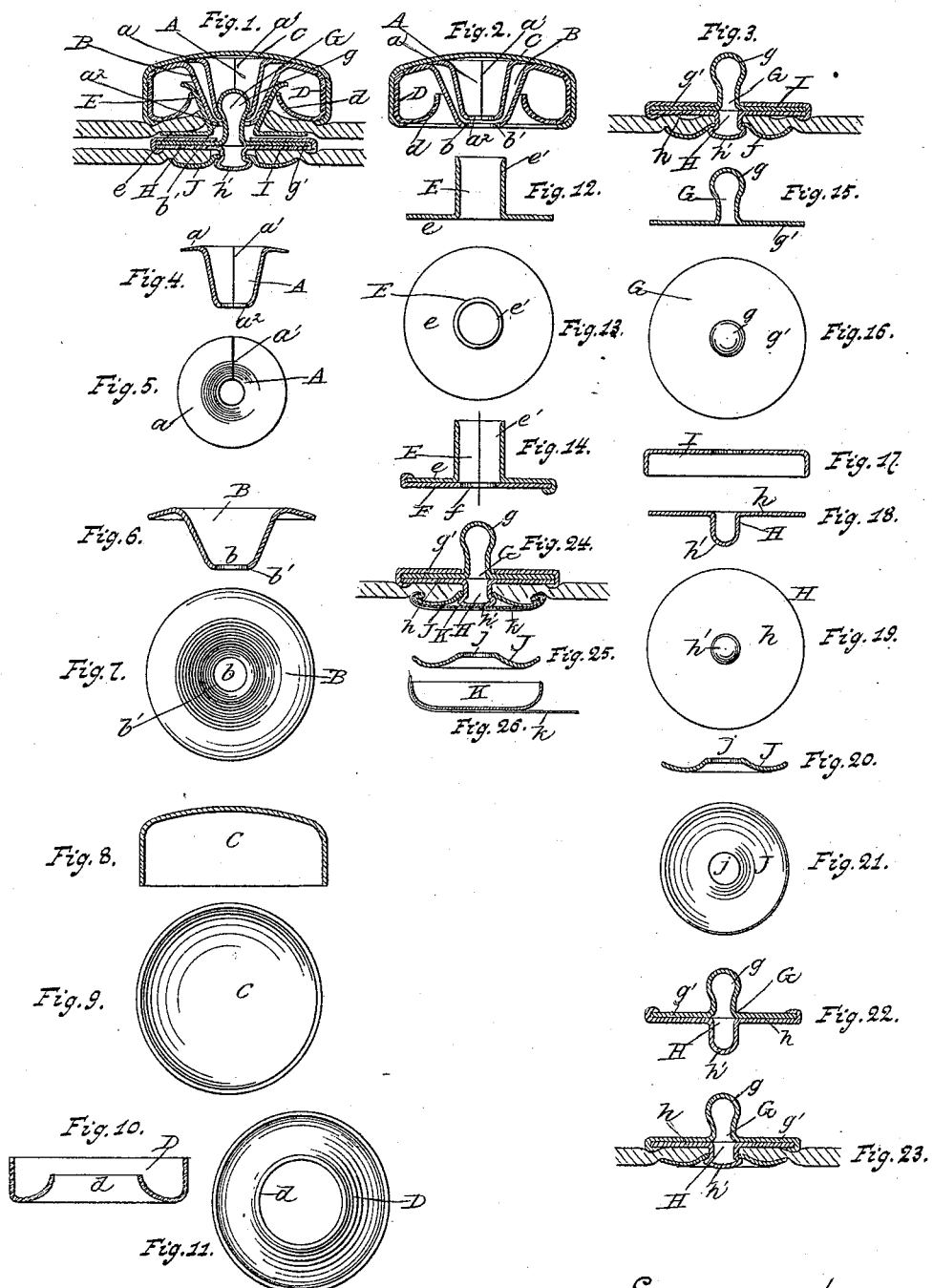
Witnesses:
William F. Selkirk
Charles Selkirk
Eugene Pringle
Inventor.

UNITED STATES PATENT OFFICE.

EUGENE PRINGLE, OF GLOVERSVILLE, NEW YORK, ASSIGNOR TO MADISON D. SHIPMAN AND CHARLES E. BRADT, BOTH OF DE KALB, ILLINOIS.

GLOVE-FASTENING.

SPECIFICATION forming part of Letters Patent No. 443,792, dated December 30, 1890.

Application filed September 8, 1888. Serial No. 284,940. (No model.)

*To all whom it may concern:*

Be it known that I, EUGENE PRINGLE, a citizen of the United States, residing at Gloversville, in the county of Fulton and State of New York, have invented certain new and useful Improvements in Separable Buttons, of which the following is a specification.

My invention relates to improvements in the button-head and stud portions of a separable button; and it consists in the devices and parts, and combinations of devices and parts, hereinafter described, and specifically set forth in the claims.

The objects of my invention are, first, to combine with the holding-stud a flanged hollow rivet for co-operation with the washer to clamp the material from its opposite sides and to unite the stud with the material; second, to combine with the flanged hollow rivet and a clamping-washer and a flanged shell form of stud clinched on the flange of the shell-formed rivet, whereby the stud will be securely united with the fabric; third, to combine with a flanged hollow rivet, which has its lower end closed, a clamping-washer secured against the material by the clinch of the closed end portion of the hollow rivet on the margin edge of the central perforation of the washer, whereby a smooth and closed surface will be produced; fourth, to combine in a button-head an elastic stud-holding catch, an outer inclosing-shell, a piece protecting or guarding the catch and holding it in place within the shell and operating as an eyelet-spreading piece, and an eyelet which will be spread by the catch protecting or guarding piece on the closing-piece of the button-head. I attain these objects by the means illustrated in the accompanying drawings, forming a part of this specification, in which—

Figure 1 is a sectional view of a button-head and stud when connected together with both secured to the fabric. Fig. 2 is a view of the button-head prior to its attachment to the fabric. Fig. 3 is a sectional view of the stud and devices securing it to the fabric. Fig. 4 is a sectional view of the elastic holding-catch. Fig. 5 is a plan view of the same. Fig. 6 is a sectional view of the catch-guarding piece. Fig. 7 is a plan view of the same. Fig. 8 is a sectional view of the outer or inclosing shell. Fig. 9 is a plan view of the same. Fig. 10 is a sectional view of the closing-piece of the button-head. Fig. 11 is a plan view of the same. Fig. 12 is a sectional view of the eyelet holding the button-head secured to the fabric. Fig. 13 is a plan view of the same. Fig. 14 is a sectional elevation of the same illustrating modifications of parts in the same. Fig. 15 is a sectional view of the stud-piece proper. Fig. 16 is a plan view of the same. Fig. 17 is a sectional view of the upper stud-holding washer. Fig. 18 is a sectional view of the stud-holding rivet. Fig. 19 is a plan view of the same. Fig. 20 is a sectional view of the binding-washer of the holding-rivet. Fig. 21 is a plan view of the same. Fig. 22 is a sectional view illustrating a modification of means for uniting the stud proper with the rivet. Fig. 23 is a sectional view of the stud and its adjuncts secured to the fabric. Fig. 24 is a sectional view of the stud and its adjuncts secured to the material and having the exposed side of the fastening covered with fabric. Fig. 25 is a sectional view of the binding-washer before being covered with fabric, and Fig. 26 is a sectional view of the fabric-covered piece.

The same letters of reference refer to like parts throughout the several views.

In the drawings, A represents an elastic stud-catch, which catch is made with a tubular form and with a flange $a$ at its upper end and having in its side wall and through its flange $a$ the slit $a'$, as illustrated in Figs. 1, 2, 4, and 5.

B is a stud-catch-guarding piece, having an inner diameter which will readily receive within it the stud-catch A, so that the lower end portions of the side walls of said pieces A and B will not touch each other. This catch-guarding piece has outside tapering surfaces for spreading the fastening-eyelet, and is also provided with an opening at its lower end to permit the passage of the stud for engagement with the stud-catch A, which is held within its chamber.

C is the outer inclosing-shell of the button-head, and it receives and covers all the operating parts of the head proper.

D is the eyelet-holding piece, which piece is concentric to the stud-catch-guarding piece B, and has made with it the internal flange $d$, which when in its place is concentric to the tapering surface of the catch-guarding piece B, as shown in Figs. 1 and 2.

When these pieces A, B, C, and D are in place and secured together, the stud-catch A will be secured from its flange $a$ between the shell C and the upper end of the catch-guarding piece B with the opening $b$ of the latter opposite the opening to the stud-holding catch, with the lip $b'$ of piece B guarding the lower end of said catch, and the catch-guarding piece B will also be securely held within shell C by the piece D and the said shell when the latter is clinched on the former, as shown in Figs. 2 and 4, or the reverse.

E is an eyelet having flange $e$ and the clinching-tube $e'$, as shown in Figs. 1, 12, 13, and 14. The flange $e$ of this eyelet E operates as a clamping device against the under side of the fabric when the button-head is secured to the latter, as illustrated in Fig. 1. When the button-head proper is secured to the fabric by the eyelet E, the tubular portion $e'$ of the latter will after passing through the fabric be spread by the contracted lower end of the catch-guarding piece B outwardly and over the margin edge of the internal flange $d$ of piece D, and will hold the button-head proper securely to the fabric and clamping the upper side of the same, as shown in Fig. 1. If preferred, the flange $e$ of eyelet E can have clinched against its lower side the stud-neck-holding piece F, as illustrated in Fig. 14, which piece F is secured to the lower side of flange $e$ of that piece by clinching, as shown, and is provided with a central opening $f$ for the entrance of the stud to the stud-catch A.

G is a shell-form or hollow stud, having its head end $g$ made in its greatest diameter a little larger than the slitted side holding-catch A, so as to pass through the opening of the holding-lip $a^2$ in the lower end of the same when force is applied. This stud G has integral with it the flange $g'$.

H is a hollow or shell-form rivet, and has with its upper and open end the flange $h$, while its lower end $h'$ is closed, as shown in Figs. 1, 18, 22, 23, and 24. This hollow or shell-form rivet H is held joined with the stud G by the flange of the one clinching on the flange of the other, as shown in Figs. 22 and 24, or by a binding-piece I, Figs. 3, 17, and 24, clinching against the sides of flanges $g'$ and $h$ of the said stud and rivet.

J is a clamping-washer having a central perforation nicely fitting the hollow rivet H. After the hollow stud H is passed through the fabric the clamping-washer J will be placed against the same with the closed end of the rivet H entering the central perforation $j$ of washer J, when by a suitable instrument the lower end $h'$ of this hollow rivet will be clinched on the margin edge surrounding the perforation $j$ of the washer J, as shown in Figs. 1, 3, 23, and 24, when the stud G will be secured to the fabric with the latter clamped securely between the flange $h$ of the rivet H and the washer J, as shown in the same figures.

K, Fig. 26, is a face wear-piece made of thin metal and closing over the lower side of the washer J and the clinching end of the rivet H, as shown in Fig. 24. The outer side surface of this piece K is covered by a cloth or other woven-fabric piece $k$, or with leather, if preferred, and both of these pieces K and $k$ are secured together on the washer by clinching, as shown in Fig. 24. This fabric or leather piece $k$ will intervene between the washer J and the person of the wearer, and will prevent the metal of the same from marking or soiling the wrist of the wearer.

Having described my invention, what I claim is—

1. In a separable button, and in combination with the tubular stud-catch A, which is slitted in one of its sides in its entire length, and an outer inclosing-shell C, the conical tubular form, stud-catch-guarding piece B, having in its lower end an opening for passage of a coacting stud to the said stud-catch A, which said piece B incloses and secures within the said outer shell C, substantially as and for the purposes set forth.

2. In a separable button, and in combination with the tubular stud-catching piece A, having an annular flange seated against the concave side of the outer inclosing-shell C and slitted in its entire length, the stud-catch-guarding piece B, having the annular guarding-lip $b$ around its opening to the stud-catching piece A, and holding with the said outer inclosing-shell from its concave side, with a fastening-eyelet which secures the button-head with the material, substantially as and for the purposes set forth.

3. In a button-head of a separable button, the combination, with the lower side-closing piece having the internal eyelet-holding flange $d$, and the outer side inclosing-shell, of the elastic stud-holding catch, stud-catch-guarding piece made with inclined sides opposite flange $d$, and the fastening-eyelet, substantially as and for the purposes set forth.

4. In a separable button, the combination, with a stud provided with a base-flange which is secured to the flange of a shell-form rivet, the tubular portion of said rivet extending in an opposite direction from said stud, of the clamping-washer J, substantially as and for the purposes set forth.

5. In a separable button, the combination, with the button-head composed of an elastic stud-holding catch provided with an internal catching-flange, an outer closing-shell, a lower side-closing shell, a stud-catch guard holding the stud-catch in place, and a fastening-eyelet, of a stud secured to a hollow rivet, and a clamping-washer secured by the upsetting of the closing end of said rivet, substantially as and for the purposes set forth.

EUGENE PRINGLE.

Witnesses:
WILLIAM F. SELKIRK,
CHARLES SELKIRK.